2 Sheets—Sheet 1.
H. D. Storer,
Planing and Matching Machine.
No. 1,190. Reissued May 21, 1861.
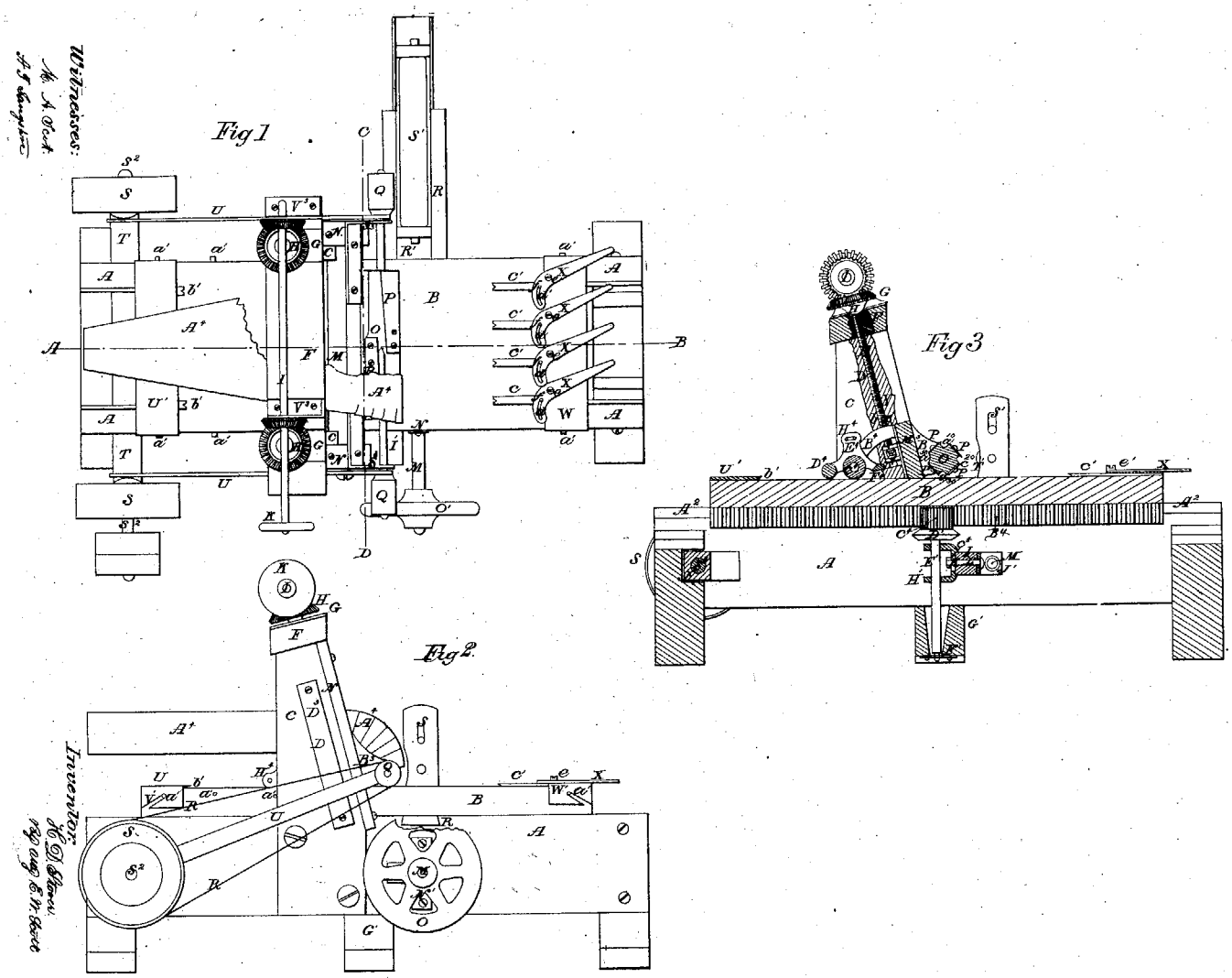

2 Sheets-Sheet 2.

H. D. Storer,

Planing and Matching Machine.

No. 1,190. Reissued May 21, 1861.

Witnesses:

M. A. Scott.

A. J. Langston

Inventor:

H. D. Storer by Atty E. M. Scott.

UNITED STATES PATENT OFFICE.

HENRY D. STOVER, OF NEW YORK, N. Y.

IMPROVEMENT IN WOOD-PLANING MACHINES.

Specification forming part of Letters Patent No. 30,993, dated December 18, 1860; Reissue No. 1,190, dated May 21, 1861.

*To all whom it may concern:*

Be it known that I, HENRY D. STOVER, of New York, in the county of New York and State of New York, have invented certain new and useful improvements in planing-machines for accurately and nicely dressing dimension lumber and boards; and I hereby declare that the following specification, in connection with the accompanying drawings and letters of reference marked thereon, constitute a lucid, clear, and exact description of the construction and use of the same.

Figure 4:
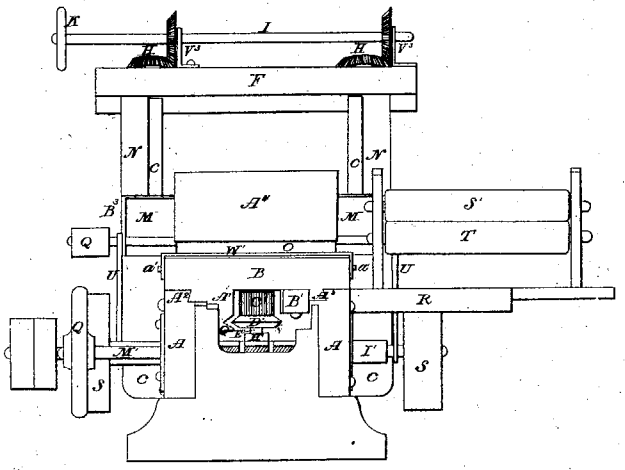
Figure 6:
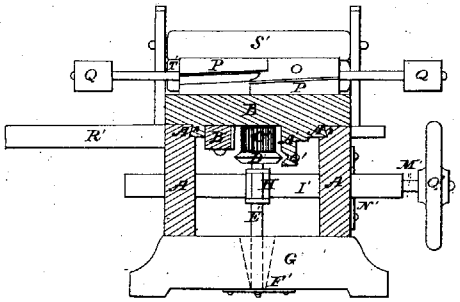
Figure 5:
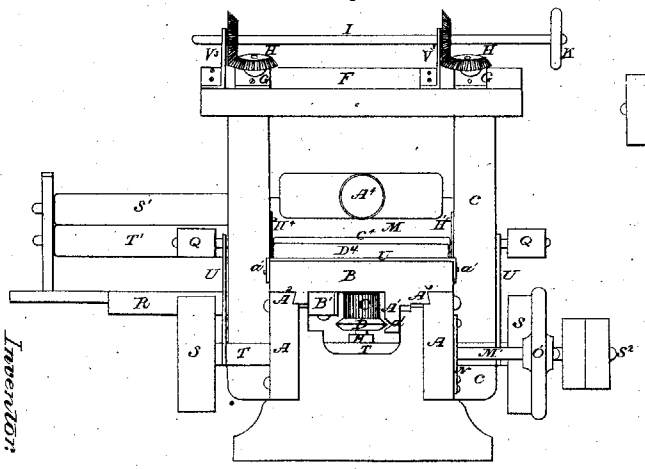

In referring to the said drawings, Figure 1 denotes a plan or top view; Fig. 2, a side elevation; Fig. 3, a central and vertical section on line A B, Fig. 1; Fig. 4, a front end elevation; Fig. 5, a back end elevation; Fig. 6, a transverse and vertical section on line C D of Fig. 1, showing parts beyond toward front end of machine.

The nature of my invention consists in the arrangement of the two screws E, for elevating lowering, and retaining the planining-cylinder in position parallel with the face of the platten, substantially as described, when combined with the platen B, operated movably to carry the lumber which is being dressed by the planing-cutters or stationary as a bed-piece over and upon which the lumber is moved by feeding-rollers to the cutting-blades, in order that the entire cutting-cylinder may be readily, easily, and positively elevated and lowered and positioned as desired, and at all times fixed for use in such position parallel to the face of the platen, ready for correctly dressing the surface of the lumber at whatever elevation the planing-cylinder may be placed; also, in incasing the raising and lowering screws, which carry the cutting cylinder, within the uprights in which they are placed, or part to which they are attached, in order to effectually exclude dust, dirt, and shavings; also, in providing the planing-cylinder with sectional cutting-blades, each imparting or performing a shearing or drawing stroke or cut, essentially as described, to effect a nearly equal cut during the entire revolution of the planing-cylinder, so as to be easily removed, sharpened, and reset for use; also, in forming that portion of the planing-cylinder which is immediately back of the edges and in contact with the face surface of the cutting-blades at an angle varying from five degrees to forty-five degrees from the plane or face surface of the cutting-blades, as the material being planed may require; also, in suspending the drive-shaft $S^2$ in movable journal-boxes, and so connecting them to the planing-cylinder by rods or otherwise that the axis of the planing-cylinder will always be equidistant from each other, to retain an equal uniform tension to the driving-belts at whatever elevation the planing-cylinder may be placed; also, in driving the platen back and forth by means of friction slide and wheel and a toothed rack and pinion; also, in starting, stopping, and reversing the movement of platen by means of screws, arranged substantially as described, for forcibly engaging the friction-wheel and its friction-slide, which is attached to the platen, and engaging or gearing the pinion with its rack, which is also connected to the platen, in order to easily and gradually start the platen and a heavy piece into motion and to quickly start the platten and light pieces into motion, as may be required; also, in the arrangement of the cross-head which carries the planing-cylinder, with the uprights on which it is raised, lowered, and operated by adjustable gib-slides, substantially as described, when combined with platen which may be operated movably or as a stationary bed for the lumber; also, in pivoting and giving a vertical adjustment to the journal-box, which carries the operating end of the friction drive roll shaft, so that it may freely swing and revolve when its friction drive-roll is engaged or disengaged from its friction-slide on the platten, and at the same time allow it to vertically adjust itself by means of the vertical movability of the journal-box for causing the friction drive-roll to correctly engage with its slide for movement of platen; also, in providing the platen, which is operated both movably and stationarily, with several holding-dogs, operated independently of each other by cam or otherwise to hold several distinct and separate pieces while being dressed; also, in providing a conductory, made of an suitable material, open near the planing cylinder and at such other place as may be desired, when so combined with the planing-cylinder that its velocity and the current of air thereby set in motion will remove the dust and shavings away from the machine through this conductory to such receptacle or place as may be desired; also, in the arrangement of an elastic surfaced pressure roll, with an adjustable rigid pressure-roll and adjustable scraper attached to and carried by cross-head for planing-cylinder by means of stands or otherwise, so that either the rigid roll or scraper can be used with the elastic roll at pleasure or as may be required, when combined with the planing-cylinder; also, in so constructing the ways or slides of the bed-piece or platen so that the platen may have a longer movement and not trip or become unsteady when more than half its weight projects over the end of the bed-piece, thereby increasing the capacity of the machine so as to plane longer pieces than could be done by planing-machines with the same length of bed and provided with the ways heretofore known; also, in the uprights, which carry the elevating screws for raising, lowering, and positioning the planing-cylinder accurately, with the top face of the platen, in combination with bed-piece, which carries the platen, for dressing the lumber, all essentially as hereinafter seen.

To enable persons skilled in the art to which my invention appertains to construct and carry out the same, I will describe it as follows:

I construct a bed-piece (seen at A), to which a platen, B, is fitted to move back and forth therein in adjustable gib-slides $A^2$ and $A^3$. By this means great durability and accuracy of movement are had for the platten, and at the same time it is effectually prevented from tipping or trembling when nearly on a balance, as is well known in other planing-machines, and this improvement allows of an essential shortening of the bed from any other known method of connecting the platen and bed-piece, and also produces a more perfect finish to the material by the uniform steady movement, especially when the planing cylinder is working near the extreme end of the platen, when on or near either end of the bed A. I erect uprights, (seen at C,) which are firmly secured to the bed A, and at their upper ends they are secured to each other by cross-bar F. These uprights have a pocket or cavity, D, formed therein, and to be inclosed by covers $D^3$ to exclude dust or shavings. In each of these cavities a screw E is positioned to freely turn in universal boxes, formed by shaping the hub of the gears H, which are attached to the upper end of each screw E of a suitable oval or curve, which conjoins with and rests universally in a corresponding cavity formed in the plates G, which are attached to and rest upon cross-bar F. The screws E are so arranged as to both be turned by one shaft I, having a balance-wheel, K, and two bevel-gears thereon, which gear into similar bevel-gears, H, on screws E. The shaft I being suspended to revolve in suitable stands, $V^3$, which are secured to top of cross-bar F, as seen in the drawings. I construct a cross head (seen at M) and attach it so as to slide freely, yet snugly, up and down on the face or front of uprights C by means of the adjustable gib-slides N. The journal-boxes $B^3$ are secured to the front of cross-head M to receive and carry the cutting-cylinder O, which is constructed and provided with four or more sectional cutting-blades, P, fitted and secured to surfaces so formed on cylinder O, and not parallel to its axis of motion, as to impart a shearing or drawing cut to the material. These blades P extend for a section or a little more than half the length of the cutting-cylinder—*i. e.*, their inner ends overlap to make the finish or cut complete or continuous the entire length of the planing-cylinder. These short sectional cutters are a saving in construction and easily removed, sharpened, and reset. That portion of the cutting-cylinder O which is immediately back of the cutting-blades P may be formed any suitable angle from five degrees to forty-five degrees, (seen at *a b c*,) to give a good finish to hard or soft wood, the number of degrees of angle to this portion of the cylinder being more than twenty-five degrees for hard and less than twenty-five degrees for soft wood. On each end of the planing-cylinder shaft is secured a suitable pulley, (seen at Q,) to be driven by belts R from drive-pulley S, fitted on shaft $S^2$, which revolve in movable journal-boxes T, which is so connected by rods U to cross-head M and planing-cylinder O that when the same is raised or lowered to or from the platen to dress thick or thin lumber the centers of drive-pulleys S and driven pulleys Q always remain at the same distance to always retain the belt at the same uniform tension, the importance and great advantage of which will be readily seen. The cross-head M and the planing-cylinder are both raised and lowered and positioned, and at all times held in position by screws E universally by means of stands V, secured to cross-head, these stands being divided into two parts where they clasp the screws E, and between these divided parts a universal nut, (seen at W), through which the screws E pass and to which they are threaded. These nuts are fitted to freely turn universally, but not to revolve with the screws E, to impart an ease of motion or required adjustment to cross-head M and planing-cylinder O.

Between the nuts W and inner surface of cavity D, in uprights G, a sliding shield, *x*, is fitted to stands V, which effectually cover the slots Y, through which the stands V move, and at whatever elevation the same is placed, so as to exclude dust and shavings from the working of the screws E and their nuts W at whatever elevation the nuts W are placed. By this arrangement the cross-head M and its planing-cylinder O are easily, freely, and securely moved up and down by simply turning one shaft.

The feeding device is constructed as follows: To the under side of the platen B a friction-slide, A′, is secured, and also a toothed rack, B′.

Between these are positioned a toothed pinion, C′, which fits into rack B′, and a friction-wheel, D′, which fits into friction slide A′. This pinion and friction-wheel are secured to a perpendicular shaft, E′, which is moved or turned at the required speed by connecting belt with any turning shaft of my machine, and suspended in journal boxes F′, secured to support G′ at its lower or under side and near to its upper end by journal-box H′, secured to sliding bar I′ by pivot K′, so as to be both vertically adjustable, and at the same time turn to freely allow the shaft E′ to conform to all the required movements given it for the feed. On the opposite side of bar I′ is secured the nut J′ by pivot L for vertical adjustment and to freely turn. Through this nut J′ passes a screw, M′, which is suspended to freely turn in bearings N′, secured to bed A. At the end of screw-arbor M′ is secured a balance-wheel, O′. By turning this wheel O′ and screw M′ in one direction the pinion C′ is geared with rack B′ to feed the platen one way, and by turning the screw M′ the other way the bar I′ and friction-wheel D′ are moved to force this wheel into and firmly against groove Q′ of slide A′. Then by the revolving of this friction-wheel the platen B is driven and in direction reverse to that of pinion C′, which will be readily understood. Suitable ways or grooves are formed transversely through track or way, as seen at R′, to which a slide is fitted which carries the feed-rolls S′ and T′, designed for surfacing boards, when the platen B is moved back out of the way of these rolls and to form the bed under the planing-cylinder. A stand with gib-slides may be attached to bed A, and on which to position and remove the feed-rolls, or any other method of sliding these rolls into and out of position may be adopted if desired. Thus all the advantages of both the dimension and surface planers are contained in one machine, and by simply sliding the feed rolls into position or out of position they are ready for use or securely placed out of the way, as may be desired. The back dogging-bar for holding the lumber is fitted to top of platen B, and drawn down to its top whenever the lumber is secured for dressing by the inclined slots V′ and pins *a*′. This bar U′ has several projecting-claws, *b*′, to receive either several distinct strips for dressing at the same time or one wide board, as may be desired. The front dogging-bar W′ is secured to platen similar to bar U′. Between it and top face of platen are several sliding dogs or claws, *c*′, corresponding to claws *b*′, and moved by cam-levers X′ with eccentric slots *d*′, pins *f*′, and pivoted by screws *e*′, to firmly secure the pieces of lumber between them for being dressed.

I construct a conductory, (seen at A″,) and so connect it to cross-head M as to conduct the dust and shavings away from the planing-cylinder through this conductory by the force or current of air put in motion by the velocity imparted to it, and by means of the several unequal shapes given the planing-cylinder in its construction these inequalities acting in the nature of a fan-blower. Two stands, $B^4$, are secured to the back side of cross-head M, to which an elastic pressure-roll, $C^4$, is attached to freely revolve therein and yield to the surface of board or piece being planed. Back of roll $C^4$ is a rigid revolving roll, $D^4$, suspended in adjustable swinging stands $E^4$, which are attached by screws $H^4$ to and carried by stands $B^4$. There is also a scraper or holder, $F^4$, fixed to the front end of adjustable stand $E^4$, which presses the board or piece firmly to the platen quite close to the cutting-blades of the planing-cylinder, to receive a beautiful finish. The arms of stands $E^4$ may be swung and secured by screws $H^4$ to bring either the scraper $E^4$ or roll $D^4$ upon the face of the finished piece, as may be desired, to plane straight and out of wind.

Having thus described my invention, I will state my claims as follows:

1. The arrangement of the two screws E for elevating, lowering, and retaining the planing-cylinder O in position parallel with the face of the platen, substantially as described, when combined with the platen B, operated movably to carry the lumber which is being dressed by the planing-cutters, or stationary as a bed-piece over and upon which the lumber is moved by feeding-rollers to the cutting-blades, in order that the entire cutting-cylinder may be readily, easily, and positively elevated or lowered and positioned as desired, and at all times fixed for use in such position parallel to the face of the platen, ready for correctly dressing the surface of the lumber at whatever elevation the planing-cylinder may be placed.

2. Incasing the raising and lowering screws E within the uprights C, in which they operate, in order to effectually exclude dust, dirt, and shavings.

3. Providing the planing-cylinder O with sectional cutting-blades P, each imparting or performing a shearing or drawing stroke or cut, essentially as described, to effect a nearly equal cut during the entire revolution of the planing-cylinder, and so as to be easily removed, sharpened, and reset for use.

4. Forming that portion of the planing-cylinder O which is immediately back of the edges and in contact with the face surface of the cutting blades at an angle varying from five degrees to forty-five degrees from the plane or face surface of the cutting-blades, as the material being planed may require.

5. Suspending the drive-shaft $S^2$ in movable journal-boxes T, and so connecting them to the planing cylinder O by rods U or otherwise that the axis of the drive-shaft and the axis of the planing-cylinder will always be equidistant from each other, to retain an equal uniform tension of the driving-belts at whatever elevation the planing-cylinder may be placed.

6. Driving the platen B back and forth by means of the friction slide A′ and friction-wheel D′ and the rack B′ and pinion C′, substantially as described.

7. Starting, stopping, and reversing the movement of platen B by means of screw M, arranged, substantially as described, for forcibly engaging the friction-wheel D′ with the friction-slide A′, which is attached to the platen, or engaging or gearing the pinion C′ with the rack B′, which is also connected to the platen, in order to easily and gradually start the platen and a heavy piece into motion and to quickly start the platen and a light piece into motion, as may be required.

8. The arrangement of the cross-head M, which carries the planing-cylinder O, with the uprights C by adjustable gib-slides N, substantially as described, when combined with platen B, which may be operated movably or as a stationary bed for the lumber.

9. Pivoting and giving a vertical adjustment by slot $C^4$ and pin K′ or otherwise to the journal-box H′, which carries the operating end of the friction drive-roll shaft, so that it may freely swing and revolve when its friction drive roll is engaged or disengaged from its friction slide A′ on the platen, and at the same time allow it to vertically adjust itself by means of the vertical movability of the journal-box for causing the friction drive-roll D′ to correctly engage with its slide A′, for the purpose set forth.

10. Providing the platen B, which is operated both movably and stationarily, with several holding-dogs, C′, operated independently of each other by cams X′ or otherwise, to hold several distinct and separate pieces while being dressed.

11. Providing the feed-roll frame with slides so adjusted to the bed-piece of the machine that the feed-rolls may be readily slid or positioned therein for use and removed therefrom.

12. Suspending, raising, and lowering the cross-head, which carries the planing-cylinder, by universal globular bearings, which are operated by and constitute the nuts for the screws E, to allow a ready parallel or desired adjustment of the cross-head in first constructing the machine, and also to admit a free, untrammeled and parallel movement to the planing-cylinder, and at the same time retaining a firm working position at whatever elevation it may be placed.

13. A conductor, A′, made of any suitable material, open near the planing cylinder and at such other place as may be desired, when so combined with the planing-cylinder that its velocity and the current of air thereby set in motion will remove the dust and shavings away from the machine through this conductor to such receptacle or place as may be desired.

14. The arrangement of the elastic surfaced pressure-roll $C^4$, with the adjustable rigid pressure-roll $D^4$, and adjustable scraper $F^4$, attached to and carried by the cross-head M by means of stands $B^4$ or otherwise, so that either the rigid roll or scraper can be used with the elastic roll $C^4$ at pleasure, or as may be required, essentially as described, when combined with the planing-cylinder, for the purpose set forth.

15. So constructing the ways or slides of the bed-piece A and of the platen B, essentially as seen at $A^2$ and $A^3$, that the platen may have a longer movement and not tip or become unsteady when more than half its weight projects over the end of the bed-piece, thereby increasing the capacity of the machine so as to plane longer pieces than could be done by planing-machines with the same length of bed and provided with the ways heretofore known.

16. The iron uprights C, carrying the elevating-screws E, for raising, lowering, and positioning the planing cylinder accurately with the top face of the platen, essentially as described, when combined with the bed-piece, which carries the platen, for dressing the lumber, essentially as set forth.

HENRY D. STOVER.

Witnesses:
GEO. W. LORD,
G. H. STOVER.